United States Patent
Datta et al.

(10) Patent No.: US 11,142,605 B2
(45) Date of Patent: *Oct. 12, 2021

(54) COMPATIBILIZED THERMOPLASTIC VULCANIZATE COMPOSITIONS

(71) Applicant: ExxonMobil Chemical Patents Inc., Baytown, TX (US)

(72) Inventors: Sudhin Datta, Houston, TX (US); Andy H. Tsou, Houston, TX (US); Ron Walker, Pearland, TX (US); Hillary L. Passino, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,844

(22) Filed: Mar. 18, 2019

(65) Prior Publication Data

US 2019/0309151 A1 Oct. 10, 2019

Related U.S. Application Data

(60) Provisional application No. 62/653,734, filed on Apr. 6, 2018.

(51) Int. Cl.
  *C08L 23/16* (2006.01)
  *C08F 236/04* (2006.01)
  (Continued)

(52) U.S. Cl.
  CPC ........ *C08F 236/045* (2013.01); *C08F 210/02* (2013.01); *C08F 210/06* (2013.01);
  (Continued)

(58) Field of Classification Search
  CPC ........ C08L 23/12; C08L 23/142; C08L 23/16; C08L 2205/03; C08L 2207/02;
  (Continued)

(56) References Cited

U.S. PATENT DOCUMENTS

2006/0116474 A1 6/2006 Jarus et al. ............ 525/88
2007/0129493 A1 6/2007 Sahnoune et al. ........ 525/191
(Continued)

FOREIGN PATENT DOCUMENTS

WO WO-2016053542 A1 * 4/2016 ............ C08L 9/00

OTHER PUBLICATIONS

Paul et al., Polymer Blends (or Alloys), Journal of Macromolecular Science, Reviews in Macromolecular Chemistry, 1980, vol. C18, No. 1, pp. 109-168.
(Continued)

*Primary Examiner* — Frances Tischler

(57) ABSTRACT

Disclosed is the preparation of compatibilized thermoplastic vulcanizates with reduced crosslinked rubber dispersion sizes and dispersity. A cross-linkable ethylene-propylene-diene terpolymer with majority propylene (PEDM) is used to compatibilize a plastic and rubber blend of a polypropylene (PP) and an ethylene-propylene-diene terpolymer rubber, where the propylene content is less than 50 wt % (EPDM), in dynamic vulcanization and preparation of PP/EPDM thermoplastic vulcanizates. The resulting PP/EPDM thermoplastic vulcanizates typically exhibit a weight average equivalent dispersion diameter of less than 3 microns and a particle size polydispersity index (PSDI), or weight average over number average dispersion diameter, of less than 5. This reduction in crosslinked rubber dispersion size in a PP/EPDM TPV by using PEDM compatibilizers enhances the toughness of the vulcanizate product by raising both elongation to break and break stress.

6 Claims, 8 Drawing Sheets

Non-uniform Dispersion

Uniform Dispersion

(51) Int. Cl.
*C08F 210/06* (2006.01)
*C08F 210/02* (2006.01)
*C08L 23/14* (2006.01)
*C08F 236/20* (2006.01)
*C08F 210/18* (2006.01)
*C08J 3/21* (2006.01)
*C08J 3/24* (2006.01)

(52) U.S. Cl.
CPC .............. *C08J 3/212* (2013.01); *C08J 3/24* (2013.01); *C08L 23/142* (2013.01); *C08L 23/16* (2013.01); *C08F 210/18* (2013.01); *C08F 236/20* (2013.01); *C08F 2500/03* (2013.01); *C08F 2500/12* (2013.01); *C08F 2500/17* (2013.01); *C08F 2500/21* (2013.01); *C08F 2500/24* (2013.01); *C08L 2205/025* (2013.01); *C08L 2205/03* (2013.01); *C08L 2205/08* (2013.01); *C08L 2207/02* (2013.01); *C08L 2207/10* (2013.01); *C08L 2312/00* (2013.01); *C08L 2312/02* (2013.01)

(58) Field of Classification Search
CPC ............ C08L 2207/10; C08L 2312/00; C08L 2205/022; C08L 2312/02; C08L 2208/08; C08L 2205/025; C08J 3/24; C08J 3/212; C08J 3/005; C08J 2423/12; C08J 2323/16; C08F 210/06; C08F 210/02; C08F 236/045; C08F 4/65927; C08F 2500/24; C08F 2500/21; C08F 4/65908; C08F 2500/17; C08F 236/20; C08F 210/18; C08F 2500/12; C08F 2500/03; C08K 5/0025

See application file for complete search history.

(56) References Cited

U.S. PATENT DOCUMENTS

| | | | |
|---|---|---|---|
| 2008/0194734 A1* | 8/2008 | Lehmann | C08L 23/10 523/351 |
| 2012/0208962 A1 | 8/2012 | Walton et al. | 525/88 |
| 2016/0289410 A1 | 10/2016 | Yamaguchi et al. | C08J 9/0061 |
| 2017/0233513 A1 | 8/2017 | Tsou et al. | C08F 210/18 |
| 2019/0309115 A1 | 10/2019 | Datta et al. | |
| 2019/0309152 A1* | 10/2019 | Datta et al. | C08F 210/02 |
| 2019/0309153 A1* | 10/2019 | Walker et al. | C08L 23/142 |

OTHER PUBLICATIONS

Boyce et al., "Micromechanisms of deformation and recovery in thermoplastic vulcanizates," Journal of the Mechanics and Physics of Solids, 2001, vol. 49, vol. 6, pp. 1323-1342.

Boyce et al., "Micromechanics of cyclic softening in thermoplastic vulcanizates," Journal of the Mechanics and Physics of Solids, 2001, vol. 49, vol. 6, pp. 1343-1360.

L. A. Utracki, "Polymer Alloys and Blends—Thermodynamics and Rheology", Hanser Publishers, New York, 1990, Part 3, pp. 131-247.

L'Abee, R. et al. (2011) "Thermoplastic Vulcanizates Based on Highly Compatible Blends of Isotactic Poly(propylene) and Copolymers of Atactic Poly(propylene) and 5-Ethylidene-2-norbornene," *Macromolecular Chem. and Phy.*, v.211(3), pp. 334-344.

* cited by examiner

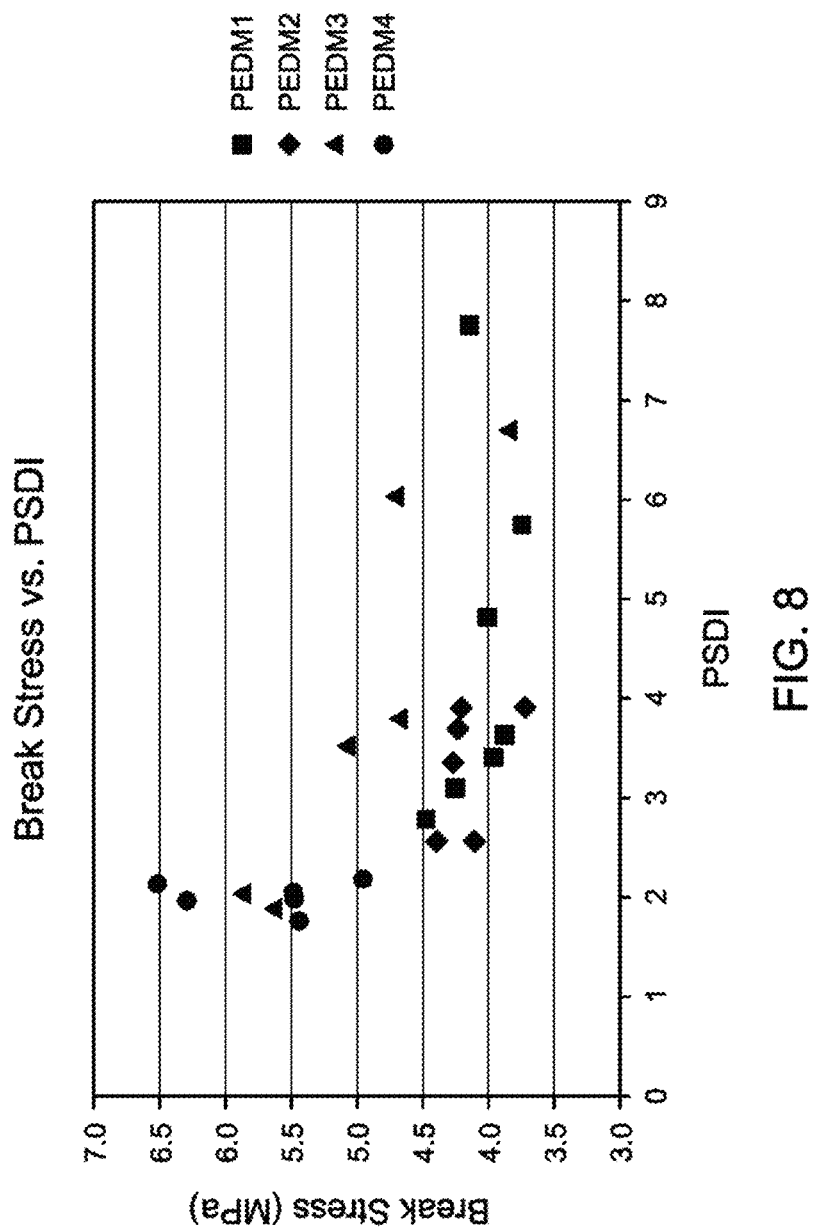

COMPATIBILIZED THERMOPLASTIC VULCANIZATE COMPOSITIONS

PRIORITY CLAIM

This application claims priority to and the benefit of U.S. Ser. No. 62/653,734 filed Apr. 6, 2018 and is incorporated by reference in its entirety.

FIELD

The present disclosure relates to thermoplastic vulcanizate compositions and methods for preparing them.

BACKGROUND

The first commercial thermoplastic vulcanizate, or TPV, was Santoprene™, which was introduced early in the 1980s. Thermoplastic vulcanizates are thermoplastic elastomers, not thermoset rubbers, and can be processed or re-processed as thermoplastics. Thermoplastic vulcanizates differ from thermoplastics at least by inclusion of dispersed vulcanized rubber particles. Vulcanization, or crosslinking, of rubbers in TPVs is necessary to keep the rubber, which is the majority blend component, as the dispersed phase, instead of the continuous phase. Following the Paul-Barrow continuity criterion (D. R. Paul and J. W. Barlow, J. Maromol. Sci., Rev. Macromol. Chem., C18, 109, (1980)), where phi 1/phi 2=eta 1/eta 2, the phase with infinite viscosity, such as crosslinked rubbers, would stay dispersed. This allows the packing of a maximum amount of rubber dispersion in a plastic matrix without rubber phase inversion. The maximum packing volume percent is limited by packing physics and is typically less than 70 vol %. By squeezing in greater than 60 vol % of crosslinked rubber dispersions inside a plastic matrix, the plastic matrix becomes inter-connecting plastic ligaments sandwiched in between dispersed crosslinked rubber particles.

Without being bound by any theory, the elasticity of a TPV is thought to derive from these thin plastic ligaments sandwiched between dispersed rubber particles. Based on experimental findings and theoretic modeling (e.g., as by M. C. Boyce, S. Socrate, K. Kear, O. Yeh, and K. Shaw, *J. Mech. Phys. Solids*, 49, 1323, (2001), and *J. Mech. Phys. Solids*, 49, 1343, (2001), these thin plastic ligaments kink or plastic flow during TPV deformation by the incompressible deformation of sandwiching crosslinked rubber dispersions. Subsequently, these plastic ligament kinks act as spatial registrations to allow elastic recovery and to deliver elasticity Thinner plastic ligaments would be easily deformed and also yield easily, for plastic flow/kink formation, relative to thick plastic ligaments. If the plastic matrix has plastic patches that are relatively large between dispersed rubber particles, these plastic flows and kink developments are not possible and this leads to poorer elastic properties. Rubber dispersion size and uniformity are important to create a uniform plastic ligament network. Greater uniformity of the plastic ligament network promotes the elastic properties of a TPV.

The particle size and uniformity of the rubber dispersion in a TPV thus can constrain the selection of plastic and rubber components for the preparation of a TPV. For a Santoprene™ TPV, which is a TPV based on isotactic polypropylene (iPP) plastic matrix, and crosslinked ethylene-propylene-diene terpolymer (EPDM) rubber dispersions, it is important to use fractional melt-flow rate (MFR) iPP to blend with EPDM in a mixer before the introduction of curatives. Since EPDM typically has much higher molecular weight (MW) than that of an iPP, use of low MFR and high MW iPP provides helpful viscosity matching during initial blending. Viscosity matching allows stress transfer across blend interfaces to produce finer dispersions (L. A. Utracki, "Polymer Alloys and Blends—Thermodynamics and Rheology", Hanser Publishers, New York, (1990)). In the case of preparing TPVs, viscosity matching promotes fine iPP dispersions inside the EPDM matrix. Once the curatives are introduced, phase inversion occurs and crosslinked EPDM becomes the dispersed phase. Although decent dispersion of crosslinked rubber can be obtained in a TPV by judicious selections of plastic and rubber components (for viscosity matching) and of twin screw extrusion elements (for phase inversion and rubber dispersion in the production process), crosslinked rubber dispersion uniformity in a TPV can be further improved for better elastic properties.

SUMMARY

In the present disclosure, a crosslinkable thermoset rubber compatibilizer, comprising (or consisting of, or consisting essentially of) one or more propylene-ethylene-diene terpolymer(s) (PEDM), is added to compatibilize blends of EPDM and iPP prior to phase inversion during dynamic vulcanization. The compatibilizer can be synthesized by organometallic coordinative insertion polymerization of propylene, ethylene, and diene—with majority propylene, preferably greater than 80 wt % by weight of the PEDM terpolymer. Using PEDM compatibilizers in polymer blends can suppress droplet coalescence, reduce interfacial tension, and lead to finer dispersions (L. A. Utracki, "Polymer Alloys and Blends—Thermodynamics and Rheology", Hanser Publishers, New York, (1990)). Adding a PEDM compatibilizer during PP/EPDM TPV preparation prior to vulcanization can provide fine PP dispersions, which, after vulcanization and phase inversion, provide fine dispersions of vulcanized EPDM inside the TPV with a result of improved mechanical toughness.

Accordingly, disclosed herein is a thermoplastic vulcanizate comprising an isotactic polypropylene matrix phase in which a cross-linked ethylene-propylene-diene terpolymer (EPDM) is dispersed, the vulcanizate being a reaction product of:
- a) 35 to 55 wt % of an ethylene-propylene-diene terpolymer (EPDM);
- b) 20 to 30 wt % of isotactic polypropylene (iPP);
- c) 10 to 25 wt % of a diluent;
- d) 0.5 to 15 wt % of a propylene-ethylene-diene terpolymer (PEDM) compatibilizer; and
- e) 1.5 to 3.0 wt % of curatives;

where each weight percent is by weight of the combined components.

Also presently disclosed is a method for preparing a thermoplastic vulcanizate (TPV) comprising (or consisting of, or consisting essentially of):
- i) mixing an iPP, EPDM, and PEDM, and a diluent to prepare a TPV formulation;
- ii) adding a diluent to the TPV formulation and continuing mixing;
- iii) adding one or more curatives to the TPV formulation and continuing mixing to perform dynamic vulcanization;

iv) adding a further portion of diluent and continuing mixing and dynamic vulcanization to form a TPV composition; and v) recovering the TPV composition.

The present disclosure also encompasses a TPV composition made by such a method comprising (or consisting of, or consisting essentially of):

i) mixing an iPP, EPDM, and PEDM, and a diluent to prepare a TPV formulation;

ii) adding a diluent to the TPV formulation and continuing mixing;

iii) adding one or more curatives to the TPV formulation and continuing mixing to perform dynamic vulcanization;

iv) adding a further portion of diluent and continuing mixing and reacting to form a TPV composition; and v) recovering the TPV composition;

in which the ethylene-propylene-diene terpolymer (EPDM) can be added in an amount from 35 to 55 wt % of the TPV formulation, the isotactic polypropylene (iPP) can be added in an amount from 20 to 30 wt % of the TPV formulation; the diluent can be added in an amount from 13 to 21 wt % of the TPV composition, and a propylene-ethylene-diene terpolymer (PEDM) compatibilizer can be added in an amount from 0.5-15 wt % of the TPV formulation.

BRIEF DESCRIPTION OF THE DRAWINGS

FIG. 8 is a graph of break stress dependence on dispersion PSDI.

DETAILED DESCRIPTION

Figure 1A:
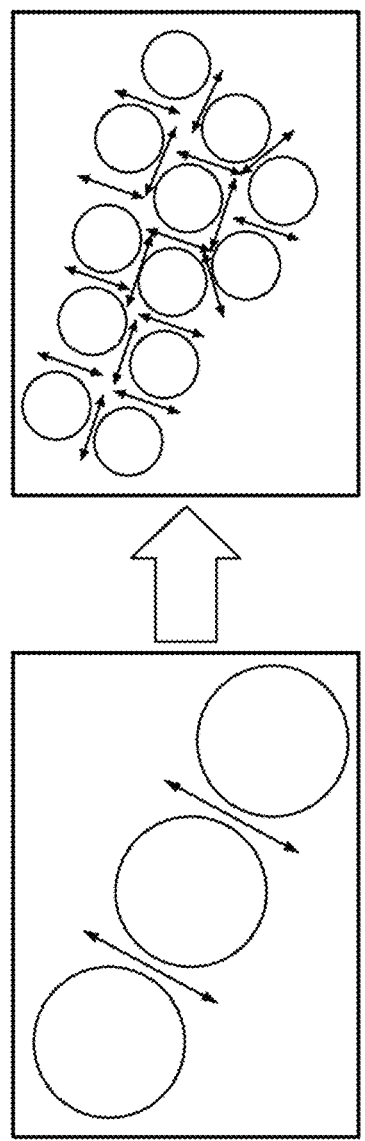
FIG. 1A illustrates rubber dispersion size and plastic ligament formation (left: large dispersions (only 2 ligaments), right: small dispersions (16 ligaments), both have the same rubber volume percent).
Figure 1B:
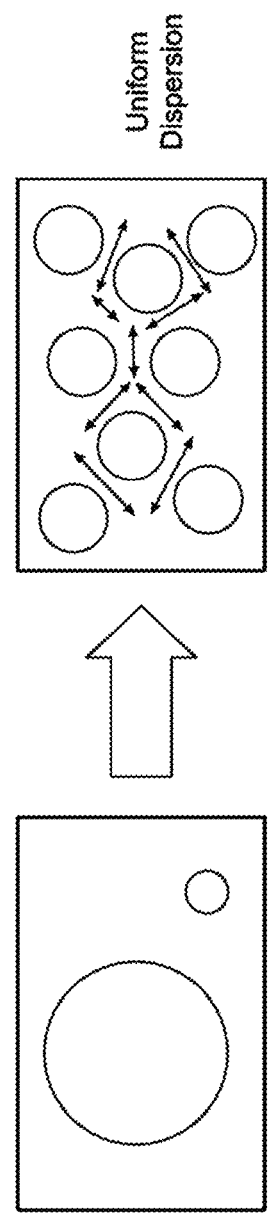
FIG. 1B illustrates rubber dispersion uniformity and plastic ligament formation (left: poor dispersion uniformity, right: good dispersion uniformity, both have the same rubber volume percent).

In the present disclosure, a crosslinkable thermoset rubber compatibilizer is added to compatibilize blends of EPDM and iPP prior to their phase inversion by vulcanization. Such a compatibilizer is typically synthesized by organometallic coordinative insertion polymerization of propylene, ethylene and diene, with majority (generally greater than 80 wt %) propylene, and is called a propylene-ethylene-diene terpolymer (PEDM). Utilizing PEDM compatibilizers in polymer blends can suppress droplet coalescence, reduce interfacial tension, and lead to finer dispersions (L. A. Utracki, "Polymer Alloys and Blends—Thermodynamics and Rheology", Hanser Publishers, New York, (1990)). Adding a PEDM compatibilizer during PP/EPDM TPV preparation prior to vulcanization can provide fine PP dispersions, which, after vulcanization and phase inversion, lead to fine EPDM dispersions inside the TPV, which provides a TPV with improved mechanical toughness. FIG. 1A shows that the number of plastic ligaments in a network increases with decreasing size of the rubber particles dispersed in the plastic matrix phase. FIG. 1B shows how increasing the uniformity of the rubber particle size dispersion provides a more distributed and more uniform plastic filament network having thinner ligaments.

For example, a TPV composition as presently disclosed can be one that has a particle size dispersity index (PSDI) of less than 5.0, although more typically the PSDI in a TPV composition as presently disclosed is less than 4.0, or less than 3.5, or less than 3.0. For example, the PSDI of a TPV according to the present disclosure can be from 1.2-6.5, or from 1.2-5, from 1.2-4, from 1.2-3.5, from 1.2-3.0, or from 1.5-3.0.

TPV Compositions

Thermoplastic vulcanizate (TPV) compositions of various embodiments may comprise, consist essentially of, or consist of: (a) an at least partially vulcanized rubber component dispersed within a continuous thermoplastic matrix; (b) oil; and, optionally, (c) one or more additives (e.g., one or more fillers, foaming agents, compatibilizers or the like). As used in this context, "consist essentially of" means that the TPV composition is free of other materials except those minor impurities (e.g., 0.1 wt % or less) that one would typically expect in normal commercial production operations. For instance, a single process line may be used in a continuous process to create multiple different types of materials in series, and some residuals (e.g., residual polymer, monomer, curative, additives, or other material) from previous product campaigns may acceptably be left in such equipment and thus incorporated into a TPV product.

Composition TPVs are formed by dynamically vulcanizing a TPV formulation. The TPV formulation of various embodiments comprises (i) a rubber component (which may or may not be oil-extended); (ii) a thermoplastic resin; (iii) an optional, polyolefin-based, typically propylene-based, elastomer (PBE) (which may be especially useful in compositions comprising Santoprene™) or a hydrogenated triblock copolymerized thermoplastic elastomer (TPE—for example hydrogenated Kraton™ (Kraton Polymers)); (iv) a vulcanizing agent or curative; (v) processing oil; (vi) a compatibilizer; and (vii) optionally, one or more additives (including, e.g., cure accelerators, metal oxides, acid scavengers, flame retardants, fillers, stabilizers, and the like). A TPV product may therefore alternatively be considered and described as the reaction product of dynamic vulcanization of a TPV formulation or "melt", or as a "dynamically vulcanized alloy" (DVA).

A TPV composition can be prepared in which the rubber component is not vulcanized, but instead comprises polymer chains associated with one another by physical means and thus promoting the inversion of the rubber and plastic phases, such as hydrogen bonds, ionic aggregation, and phase transition (e.g., crystallization or a glass transition); thus, a TPV formulation not yet subjected to a covalent cross-linking chemical reaction can be prepared in which physical cross links can be removed by heating.

Rubber Component

The "rubber" component of TPV formulations or compositions generally is a crosslinkable (vulcanizable) rubber component, such that upon dynamic vulcanization, the rubber component in the resulting TPV composition (i.e., resulting from processing, including by dynamic vulcanization, of the TPV formulation) of such embodiments is at least partially crosslinked, preferably fully crosslinked. Generally, the term "rubber" refers to any natural or synthetic polymer exhibiting elastomeric properties, and may be used herein synonymously with "elastomer." The rubber component may comprise one rubber, or a mix of two or more rubbers.

In the TPV compositions presently disclosed, one or more EPDM rubbers are used as the rubber component.

For example, the rubber component can be any ethylene-propylene-diene (EPDM) rubber, or EPDM-type rubber, for example, an EPDM-type rubber can be a terpolymer derived from the polymerization of at least two different monoolefin monomers having from 2 to 10 carbon atoms, preferably 2 to 4 carbon atoms, and at least one poly-unsaturated olefin having from 5 to 20 carbon atoms. U.S. Pat. Nos. 3,037,954 and 4,811,628, hereby incorporated by reference in their entirety and for all purposes, describe TPVs having a polypropylene matrix and EPDM rubber component.

The EPDM rubber can be one that comprises from 50-80 wt % ethylene and 1-15 wt % ethylene norbornene, based on the weight of the EPDM rubber. More typically, the EPDM rubber can be one that comprises from 45-75 wt % ethylene and 2-10 wt % ethylene norbornene, or from 50-65% ethylene and 2 to 10% ethylene norbornene.

The rubber component is preferably present in the TPV formulation in an amount within the range from 40 to 80 wt %, preferably 50 to 70 wt %, such as 55 to 65 wt %, based on total weight of the TPV, excluding both of processing and extender oils, with ranges from any of the foregoing low ends to any of the foregoing high ends also contemplated in various embodiments. Note that these wt % values for rubber component are exclusive of any extender oil that may be formulated with the rubber component (e.g., for ease of processing). The TPV formulation of some embodiments may optionally comprise 5 to 30 wt %, such as 10 to 25 wt % or 12 to 24 wt % (with ranges from any of the foregoing lows to any of the foregoing highs also contemplated) of extender oil, where the rubber component includes extender oil.

Alternatively, the rubber component amount in the TPV composition may be expressed in terms of wt % inclusive of any extender oil that may be present in the rubber component, but not including any oil added during processing ("processing oil"). In such cases, the rubber component (inclusive of extender oil) may be present in the TPV composition within the range from 35 to 80 wt %, preferably 45 to 70 wt %, such as 50 to 65 wt % (again, with ranges from any of the foregoing lows to any of the foregoing highs also contemplated in various embodiments).

Thermoplastic Component

TPV formulations and/or TPV compositions generally include a thermoplastic component comprising at least one olefinic thermoplastic resin. The thermoplastic resin may be a polymer or polymer blend considered by persons skilled in the art as being thermoplastic in nature, e.g., a solid polymer that softens and becomes molten when exposed to heat and returns to solid when cooled to 23° C. The olefinic thermoplastic component may contain one or more polyolefins, including polyolefin homopolymers and polyolefin copolymers.

The term "polypropylene" as used herein broadly means any polymer that is considered a "polypropylene" by persons skilled in the art and includes homopolymers as well as impact, random, and other copolymers of propylene. Preferably, the polypropylene used in the TPVs described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units, with the remainder derived from one or more olefins selected from the group consisting of ethylene and $C_4$ to $C_{10}$ $\alpha$-olefins.

The thermoplastic resin may have a melting temperature of at least 110° C. (230° F.), or at least 120° C. (248° F.), or at least 130° C. (266° F.), and may range from 110° C. (230° F.) to 170° C. (338° F.) or higher as measured by Differential Scanning calorimetry (DSC) as described in detail below.

The procedure for DSC analysis of the thermoplastic component is as follows: 6 to 10 mg of a sheet of the resin pressed at approximated 200° C. (392° F.) to 230° C. (446° F.) is removed with a punch die and then annealed at about 23° C. (74° F.) for 240 hours. At the end of this period, the sample is placed in a Differential Scanning calorimeter (Perkin Elmer 7 Series Thermal Analysis System) and cooled at a rate of 10° C. (50° F.)/min to −50° C. (−58° F.) to −70° C. (−274° F.). The sample is then heated at a rate of 20° C. (68° F.)/min to attain a final temperature of 200° C. (392° F.) to 220° C. (428° F.). The thermal output during this heating cycle is recorded as the area under the melting peak of the sample and is measured in Joules as a measure of the heat of fusion. The melting temperature is recorded as the temperature of the greatest heat absorption within the range of melting of the sample.

In some embodiments, the thermoplastic resin has MFR of 20 g/10 min or less, 15 g/10 min or less, more preferably 10 or less, 5 or less, 3 or less, or even 1 or less, in some embodiments (measured per ASTM D1238, at 230° C. (446° F.) and 2.16 kg mass). For instance, MFR of the thermoplastic resin may be within the range from a low of any one of 0.01, 0.1, and 0.5 g/10 min to a high of any one of 1, 3, 5, 10, 15, 16 or 20 g/10 min (ASTM D1238, 230° C. (446° F.) and 2.16 kg). In certain of these embodiments, the thermoplastic component comprises only thermoplastic resin with MFR according to the foregoing description.

In yet other embodiments the TPV composition (and/or the TPV formulation) may comprise two or more thermoplastic resins, which can be two or more polypropylene resins. In particular, the TPV composition may comprise (i) a low-MFR thermoplastic resin having MFR of 15 g/10 min or less (or other MFR per the above description); and (ii) a high-MFR thermoplastic resin having MFR of greater than 15 g/10 min, for instance, within the range from greater than 15 to 50 g/10 min, preferably within the range from greater than 15 to 25 g/10 min, such as 16 to 24 g/10 min. The high-MFR thermoplastic resin may otherwise be in accordance with the above-given descriptions of suitable thermoplastic resins (e.g., with respect to monomeric constituents, melting temperature, and the like). In certain of these embodiments employing multiple thermoplastic resins, the TPV composition and/or formulation preferably includes more low-MFR thermoplastic resin than high-MFR thermoplastic resin. The low-MFR thermoplastic resin is used to provide viscosity matching during TPV manufacturing for finer vulcanized rubber dispersions whereas the high-MFR thermoplastic resin is employed to provide TPV processability for injection molding and other fabrication techniques that require lower TPV viscosity. For instance, of the combined weight of the low-MFR and high-MFR thermoplastic resin, 51 to 99 wt % is low-MFR, such as 55 to 95 wt %, or 55 wt % to 75 wt %, with the balance being the high-MFR thermoplastic resin.

In summary, then, TPV compositions and/or formulations according to some embodiments include a first (low-MFR) thermoplastic resin and optionally a second (high-MFR) thermoplastic resin, such that the second thermoplastic resin is present at 0 wt % to 49 wt % of the combined amount of first and second thermoplastic resin. Where the second thermoplastic resin is present, it is preferably present within the range of 1 wt % to 49 wt %, such as 5 to 49 wt %, or 10 to 35 wt %, such as 12 to 33 wt %, of the combined amount of first and second thermoplastic resin (with ranges from any of the foregoing lows to any of the foregoing highs, e.g., 1 to 33 wt %, also contemplated in various embodiments).

In the presently disclosed compositions and methods, the thermoplastic resin is an olefinic thermoplastic resin that comprises, or consists of, polypropylene. In preferred embodiments, the thermoplastic component comprises, in some embodiments consists of, an isotactic polypropylene.

Amount of Thermoplastic Component: In many embodiments, the thermoplastic component of a TPV composition and/or TPV formulation makes up from 10 to 40 wt % of the TPV composition and/or TPV formulation, based on the total weight of the TPV formulation, including both of extender and processing oils. Other contemplated ranges include 15 to 30 wt % and 17 to 25 wt %, with ranges from any of the foregoing low ends to any of the foregoing highs ends also contemplated in various embodiments.

Oil

TPVs (and TPV formulations used in making the TPVs) may further comprise oil, including process oil (added to the TPV formulation, as described previously) and/or extender oil (which may be present in the rubber component included in the TPV formulation, also as described previously). The oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha-olefinic synthetic oils, such as liquid polybutylene. Additive oils other than petroleum based oils can also be used, such as oils derived from coal tar and pine tar, as well as synthetic oils, e.g., polyolefin materials. In particular embodiments, oil included in the TPV is selected based on API groupings (e.g., an API Group I, Group II, Group III, Group IV, or Group V base stock oil may be used as the oil in the TPV). In particular embodiments, oil included in the TPV comprises Group II or higher oil, such as Group II oil (e.g., ParaLux™ 6001R process oil, available from Chevron-Texaco Corp.). Also or instead, the oil could include white oil (e.g., pharmaceutical grade oil, such as Primol™ 542 medicinal grade white oil, available from ExxonMobil Chemical Company, Baytown, Tex.).

Process oil may be added to a TPV formulation (and/or may be present in a resulting TPV composition) in total amounts ranging from 5 to 200 phr (parts by weight per 100 parts by weight rubber component), preferably 50 to 150 phr, such as 75 to 125 phr, with ranges from any of the foregoing lows to any of the foregoing highs also contemplated in various embodiments. Put in terms of wt %, process oil may be added to the TPV formulation in amounts within the range from 10 to 70 wt %, preferably 20 to 60 wt %, such as 40 to 60 wt %, such weight percentages based on total weight of the TPV formulation, and with ranges from any of the foregoing lows to any of the foregoing highs also contemplated in various embodiments.

Extender oil may be present in the rubber component in amounts within the range from 0 phr to 150 phr, such as 25 to 125 phr, or 50 to 100 phr (0 to 30 wt %, preferably 10 to 25 or 12 to 20 wt %, based on total weight of the TPV formulation), with ranges from any of the foregoing lows to any of the foregoing highs also contemplated.

Total additive oil (extender oil+process oil) may therefore be within the range from 5 to 350 phr (or 5 to 70 wt %) based on total weight of TPV formulation.

Cure Agents

The TPV formulation also includes a vulcanizing agent, which may be at least in part consumed during dynamic vulcanization of the TPV formulation. Any vulcanizing agent that is capable of curing or crosslinking the rubber employed in preparing the TPV may be used. For example, where the rubber includes an olefinic elastomeric copolymer, the cure agent may include peroxides, phenolic resins, free radical curatives, and/or other curatives conventionally employed. In some embodiments, the vulcanizing agent comprises a phenolic resin, and may be, for instance, a phenolic resin-in-oil cure agent (where the oil added with the resin forms part of the process oil added to the TPV formulation during processing). Cure accelerators (e.g., metal halides such as stannous chloride, zinc oxide, and the like) may be used in the TPV formulation in conjunction with the vulcanizing agent. Particularly useful vulcanizing agents, including phenolic resins, and cure accelerators, including stannous chloride, are described in Paragraphs [0046] to [0054] of PCT Application No. PCT/US2015/65048, filed Dec. 10, 2015, which description is hereby incorporated by reference. "Curatives" encompasses both vulcanizing agents and curing accelerators.

Curative compositions as described above are typically added to a TPV formulation in an amount of from 1.5 to 3.0 wt % of the TPV formulation, for example from 2.0 to 3.0 or from 2.0 to 2.25 wt %.

Other Additives

The TPV formulations and/or TPV compositions of various embodiments may also include one or more additives, including metal oxides, acid scavengers, reinforcing and non-reinforcing fillers and/or extenders, antioxidants, stabilizers (e.g., UV stabilizers), antiblocking agents, anti-static agents, waxes, foaming agents, pigments, flame retardants, and any other additive, such as processing aids known in the rubber compounding art. In some embodiments, the composition further comprises at least one additive selected from fillers, processing aids, curing accelerators, or combinations thereof.

For example, the TPV composition may include reinforcing and non-reinforcing fillers, antioxidants, stabilizers, antiblocking agents, anti-static agents, waxes, foaming agents, pigments, flame retardants and other processing aids (other than the process oils described above) known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

In one or more embodiments, the TPV formulation and/or composition includes at least 5, 6, 7, 8, 9, or 10 wt % of one or more fillers, such as calcium carbonate, clays, silica, talc, titanium dioxide, carbon black, and blends thereof, based on the weight of the TPV formulation or composition, as applicable. In preferred embodiments, the TPV formulation and/or composition includes clay and/or carbon black in an amount ranging from a low of any one of 5, 6, 7, 8, 9, or 10 to a high of any one of 15, 16, 17, 18, 19, or 20 wt % based on the total weight of the TPV formulation or TPV composition, as applicable. In one or more embodiments, the TPV composition or formulation comprises antioxidants in an amount less than or equal to 5 wt %, or 4 wt %, or 3 wt %, or 2 wt %, or 1 wt %, or 0.5 wt %, based on the total weight of the TPV composition or formulation.

Compatibilizer

As explained above, incorporating a compatibilizer into the TPV formulation (or composition) provides an improvement in particle size distribution, measured as Dw/Dn and called "particle size dispersity index" (PSDI) with an attendant improvement in some physical properties of the resulting TPV composition. The improvement that is reduction, in PSDI is over and above that achieved by only viscosity matching the rubber and thermoplastic components. In any embodiment, the inventive composition have a Dw/Dn (PSDI) of less than 8, or 7, or 6, or 5, or 4, or 3, or 2.5, or within a range from 1, or 2 to 2.5, or 3, or 4, or 5, or 6, or 7, or 8.

A PEDM compatibilizer is typically added in an amount of from 0.2 to 20 wt % (of the TPV formulation or TPV composition). In some instances, the amount of the compatibilizer is from 0.3 to 15 wt %, or from 0.5 to 15 wt %, or from 1 to 15 wt %, or from 2 to 10 wt % in a TPV formulation or TPV composition.

In a TPV composition or a TPV formulation as presently disclosed, a PEDM compatibilizer can be present in an amount of 1 to 35 wt %, or 2 to 30 wt % or 3 to 25%, of the amount of an EPDM rubber component of the TPV composition or TPV formulation.

In the present disclosure, a propylene-ethylene-diene terpolymer rubber (PEDM) is used as a compatibilizer.

Propylene-Ethylene-Diene Terpolymer

The "propylene-ethylene-diene terpolymer" as used herein may be any polymer comprising ethylene, propylene, a diene and other comonomers, such as styrene or norbornene. The term "polymer" refers to any carbon-containing compound having repeat units from one or more different monomers. Preferably the propylene-ethylene-diene based polymer comprises ethylene-derived units, propylene-derived units, and, optionally, diene-derived units. For example, the propylene-ethylene-diene terpolymer may be an ethylene propylene-α-olefin-diene terpolymer. The propylene-ethylene-diene terpolymers may be prepared by polymerizing ethylene and propylene with one or more dienes.

The comonomers may be linear or branched. Preferred linear comonomers include ethylene or $C_3$ to $C_8$ α-olefins, more preferably ethylene, propylene, 1-butene, 1-hexene, and 1-octene, even more preferably ethylene or propylene. Preferred branched comonomers include 4-methyl-1-pentene, 3-methyl-1-pentene, 2-ethyl-1-butene, and 3,5,5-trimethyl-1-hexene. In one or more embodiments, the comonomers may include styrene.

The dienes may be conjugated or non-conjugated. Preferably, the dienes are non-conjugated. Illustrative dienes may include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB.

The propylene-ethylene-diene terpolymer may have an ethylene amount of from 2 wt % by weight to 25 wt % by weight of the PEDM terpolymer, or from 5 wt % to 25 wt %, or from 7 wt % to 25 wt %, or from 10 wt % to 25 wt %, based on the weight of the PEDM polymer. The balance of the propylene-ethylene-diene terpolymer comprises propylene and, optionally, one or more dienes.

Preferably, the propylene-ethylene-diene terpolymer comprises a diene content of from 1 wt % to 21 wt % based on the weight of the PEDM polymer, or from 1.5 wt % to 15 wt %, or from 2 wt % to 15 wt %, or 3 wt % to 10 wt %, or from 3 wt % to 8 wt %, based on the weight of the PEDM polymer. Other useful ranges include from 1 wt % to 18 wt %, or from 1 wt % to 15 wt %, or from 1 wt % to 10 wt %, or from 3 wt % to 12 wt %, or from 4 wt % to 12 wt % based on the weight of the PEDM polymer. In one or more embodiments, the propylene-ethylene-diene terpolymer may comprise 5-ethylidene-2-norbornene in an amount of from 1 wt % to 21 wt %, or from 1.5 wt % to 15 wt %, or from 3 wt % to 20 wt %, or from 3 wt % to 18 wt %, or from 3 wt % to 15 wt %, based on the weight of the PEDM polymer.

A PEDM used in the TPV presently disclosed can be one including 5 to 18% ethylene and 2 to 12 wt % ethylene norbornene-derived units by weight of the PEDM.

The propylene-ethylene-diene terpolymer may have a weight average molecular weight (Mw) of 5,000,000 or less, a number average molecular weight (Mn) of 3,000,000 or less, a z-average molecular weight (Mz) of 10,000,000 or less, and a g' index of 0.95 or greater measured at the weight average molecular weight (Mw) of the polymer using isotactic polypropylene as the baseline, all of which may be determined by size exclusion chromatography as described below. The propylene-ethylene-diene terpolymer may have an Mn of from 5,000 to 5,000,000 g/mole, or from 10,000 to 1,000,000 g/mole, or from 20,000 to 500,000 g/mole, or from 30,000 to 400,000 g/mole.

The molecular weight distribution index (MWD=(Mw/Mn)), sometimes referred to as a "polydispersity index" (PDI), of the propylene-ethylene-diene terpolymer may be from 1.2 to 40. For example, the propylene-ethylene-diene terpolymer may have an MWD with an upper limit of 40, or 20, or 10, or 9, or 7, or 5, and a lower limit of 1.2, or 1.5, or 1.7. In one or more embodiments, the MWD of the propylene-ethylene-diene terpolymer is 1.5 to 7, or from 1.7 to 5.

The propylene-ethylene-diene terpolymer may have a g' index value of 0.95 or greater, or at least 0.98, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l},$$

where $\eta_b$ is the intrinsic viscosity of the propylene-ethylene-diene terpolymer and $\eta_l$ is the intrinsic viscosity of a linear polymer of the same viscosity-averaged molecular weight ($M_v$) as the propylene-ethylene-diene terpolymer. Thus, $\eta_l = KW_v^{\alpha}$, where K and α are measured values for linear polymers and should be obtained on the same instrument as the one used for the g' index measurement, which is described above for the GPC-SEC method below for determining molecular weights.

The propylene-ethylene-diene terpolymer may have a density of from 0.83 g/cm$^3$ to 0.92 g/cm$^3$, or from 0.85 g/cm$^3$ to 0.91 g/cm$^3$, or from 0.85 g/cm$^3$ to 0.90 g/cm$^3$, at 23° C. as measured per the ASTM D-1505 test method.

The propylene-ethylene-diene terpolymer may have a melt flow rate (MFR, 2.16 kg weight at 230° C.), equal to or greater than 0.2 g/10 min as measured according to the ASTM D-1238. Preferably, the MFR (2.16 kg at 230° C.) is from 0.2 g/10 min to 200 g/10 min, or from 0.2 g/10 min to 100 g/10 min, or from 0.2 g/10 min to 50 g/10 min, or from 0.2 g/10 min to 30 g/10 min, or from 0.2 g/10 min to 25 g/10 min, or from 0.5 g/10 min to 25 g/10 min.

The propylene-ethylene-diene terpolymer may have a Mooney viscosity ML (1+4) at 125° C., as determined according to ASTM D1646, of greater than 5, or greater than 10, or greater than 15, or greater than 20.

The propylene-ethylene-diene terpolymer may have a heat of fusion ($H_f$) determined by the DSC procedure described below, which is greater than or equal to 0 Joules per gram (J/g), and is equal to or less than 50 J/g, or equal to or less than 40 J/g, or equal to or less than 30 J/g, or equal to or less than 20 J/g, or equal to or less than 10 J/g, or equal to or less than 7 J/g. Preferred propylene-ethylene-diene terpolymers may have a heat of fusion ranging from a lower limit of 0 J/g, to an upper limit of 7 J/g, or 10 J/g, or 20 J/g, or 30 J/g, or 40 J/g or 50 J/g.

The crystallinity of the propylene-ethylene-diene terpolymer may be expressed in terms of percentage of crystallinity (i.e., % crystallinity), as determined according to the DSC procedure described below. The propylene-ethylene-diene terpolymer may have a % crystallinity of less than 15%, or less than 10%, or less than 5%, or less than 3%. In some embodiments, the propylene-ethylene-diene terpolymer may have a % crystallinity of from 0% to 3%, or from 0.05% to 3%, or from 0.1% to 3%. In one or more embodiments, the propylene-ethylene-diene terpolymer may have crystallinity of less than 3%, or from 0.25% to 3%, or from 0.5% to 3%, or from 0.75% to 2%. (The degree of crystallinity is determined by dividing heat of fusion measured with the heat of fusion for 100% crystalline polypropylene which has the value of 207 J/g (B. Wunderlich, Thermal Analysis, Academic Press, 1990, pp. 417-431.)

The propylene-ethylene-diene terpolymer preferably may have a single broad melting transition. However, the propylene-ethylene-diene terpolymer may show secondary melting peaks adjacent to the principal peak, but for purposes herein, such secondary melting peaks are considered together as a single melting point, with the highest of these peaks (relative to baseline as described herein) being considered as the melting point of the propylene-ethylene-diene terpolymer. PEDM terpolymers are typically amorphous.

The propylene-ethylene-diene terpolymer may have a melting point, as measured by the DSC procedure described herein, of equal to or less than 100° C., or less than 90° C., or less than 80° C., or less than or equal to 75° C. In one or more embodiments, the propylene-ethylene-diene terpolymer may have a melting point of from 10° C. to 80° C., or from 15° C. to 75° C., or from 20° C. to 70° C. In one or more embodiments, the propylene-ethylene-diene terpolymer may not have a melting point and is amorphous.

The propylene-ethylene-diene terpolymer can have a Tg range, as determined by the DSC procedure described herein, from −25° C. to −2° C., or from −20° C. to −2° C., or from −15° C. to −2° C., or from −10° C. to −2° C.

The Differential Scanning calorimetry (DSC) procedure may be used to determine heat of fusion and melting temperature of the propylene-ethylene-diene terpolymer. The method is as follows: approximately 6 mg of material placed in microliter aluminum sample pan. The sample is placed in a Differential Scanning calorimeter (Perkin Elmer or TA Instrument Thermal Analysis System) and is heated from ambient to 210° C. at 10° C./minute and held at 210° C. for 5 minutes. Afterward, the sample is cooled down to −40° C. at 10° C./minute and this cooling curve is used to measure the Tg. The sample is held at −40° C. for 5 minutes and then heated from −40° C. to 210° C. at 10° C./minute. During the second heating cycle, appearance of melting indicates crystallinity and thus measured heat of fusion is used to compute the crystallinity. The thermal output, recorded as the area under the melting peak of the sample, is a measure of the heat of fusion and may be expressed in Joules per gram of polymer. The melting point is recorded as the temperature of the greatest heat absorption within the range of melting of the sample relative to a baseline measurement for the increasing heat capacity of the polymer as a function of temperature.

The propylene-ethylene-diene terpolymer may be a blend of discrete random propylene-ethylene-diene terpolymers as long as the polymer blend has the properties of the propylene-ethylene-diene terpolymer as described herein. The number of propylene-ethylene-diene terpolymers may be three or less, or two or less. In one or more embodiments, the propylene-ethylene-diene terpolymer may include a blend of two propylene-ethylene-diene terpolymers differing in the olefin content, the diene content, or the both. Preparation of such polymer blend may be found in US 2004/0024146 and US 2006/0183861, both hereby incorporated by reference in their entirety.

Preparing TPV Compositions

As those skilled in the art appreciate, dynamic vulcanization includes a process whereby a rubber that is undergoing mixing with a thermoplastic resin is cured (i.e., crosslinked, or vulcanized). The rubber is crosslinked or vulcanized under conditions of high shear at a temperature above the melting point of the thermoplastic resin. As a result of the process, the thermoplastic resin becomes the continuous phase of the mixture and the rubber becomes dispersed as a discontinuous phase within the continuous thermoplastic phase. Thus, in some embodiments, the mixture (e.g., the TPV formulation) undergoes a phase inversion during dynamic vulcanization, where the blend, which initially includes a major volume fraction of rubber, is converted to a blend where the plastic phase is the continuous phase and the rubber is simultaneously crosslinked and dispersed as fine particles within the thermoplastic matrix.

In general, the dynamic vulcanization of the TPV formulation takes place within a reactor, such as an extruder, melt-mixer, or other reactive mixing device (for example, a Banbury mixer or a Brabender mixer). An intermeshing twin-screw extruder is a preferred mixer. Furthermore, not all components of the TPV formulation need necessarily be introduced to the reactor at the same time. See, for example, U.S. Patent Publication 20170292016, hereby incorporated by reference in its entirety and for all purposes, which discloses addition of colorant and other additives both during and after the dynamic vulcanization process, as well as a "masterbatch" method of adding either or both of a curative formulation and a formulation of additional additives.

For instance, dynamic vulcanization can be performed as follows: The rubber component and thermoplastic component are mixed to form a blend, which may be referred to as a solids blend (although not all components of the blend need necessarily be in the solid state). Optional solid additives, such as cure accelerator, fillers, zinc oxide, and miscellaneous solids such as pigments and antioxidants, may be added to the solids blend. The blend is continually mixed at a temperature above the melt temperature of the thermoplastic resin to form a molten blend or "melt". The vulcanizing agent (e.g., curative), which may be in the form of a solid or a liquid, is introduced to the molten blend to form a vulcanizable blend. Heating and mixing continues in order to effect dynamic vulcanization.

Processing oil can be introduced at any stage, or in multiple stages, of the process. For example, oil can be added to the solids blend, to the molten blend, together with the curative (e.g. as a resin-in-oil or "RIO" composition), or after dynamic vulcanization—or at any two or more of the foregoing points in the process. Processing oils are necessary for cooling the extruder to prevent viscous over-heating and to lower the viscosity in order to avoid extruder over-torque.

Methods according to particular embodiments include "preloading" process oil, meaning that a portion of the process oil is introduced to the TPV formulation before the curative is introduced. Surprisingly, it has been found that some degree of oil preloading may result in increased tensile properties of the resulting TPV, without increasing hardness, which may be desired in some foaming applications.

According to such embodiments, the preloaded oil (e.g., a first portion of process oil) is introduced into the molten blend of TPV formulation components before introducing the curative. Preferably, at least 15 wt %, more preferably at least 30 wt %, such as at least 40 wt %, or at least 50 wt %, of the total process oil used in forming the TPV is preloaded (i.e., introduced before the curative). In some embodiments, the amount of preloaded process oil is within the range from 15 to 60 wt %, such as 20 to 60 wt %, preferably 25 to 60 wt %, such as 25 to 55 wt %, 30 to 50 wt %, or 35 to 45 wt %, with ranges from any of the foregoing low ends to any of the foregoing high ends also contemplated in various embodiments. These weight percentage values are based on total weight of process oil added to the TPV (which is exclusive of any extender oil that may be present in the rubber component, but which includes process oil that might be added to the process with the curative, as is the case with phenolic resin-in-oil curatives).

Following dynamic vulcanization, mixing may continue and additional additives or ingredients can be incorporated into the molten product, which may be referred to as a molten thermoplastic vulcanizate. For example, post-vulcanization additives, such as acid scavengers (and additional process oil, as noted), can be added to the molten mass following dynamic vulcanization. The product can then be extruded through an extruder die, or otherwise fabricated, and ultimately cooled for handling and/or further processing. For example, the molten thermoplastic vulcanizate composition may be cooled and/or solidified and subsequently pelletized for future storage and/or shipment. Practice of embodiments of the present disclosure is not necessarily limited by the manner in which the thermoplastic vulcanizate composition is subsequently solidified or fabricated.

The process of dynamic vulcanization as described herein can take place in a continuous mixing reactor, which may also be referred to as a continuous mixer. Continuous mixing reactors may include those reactors that can be continuously fed ingredients and that can continuously have product removed therefrom. Examples of continuous mixing reactors include twin screw or multi-screw extruders (e.g., ring extruders). Methods and equipment for continuously preparing thermoplastic vulcanizates are described in U.S. Pat. Nos. 4,311,628; 4,594,390; 5,656,693; 6,147,160; and 6,042,260, as well as WO 2004/009327, which are incorporated herein by reference, although methods employing low shear rates can also be used. The temperature of the blend as it passes through the various barrel sections or locations of a continuous reactor can be varied as is known in the art. In particular, the temperature within the cure zone may be controlled or manipulated according to the half-life of the curative employed.

In the present disclosure, the thermoplastic component added to a formulation processed to prepare a TPV can be an isotactic polypropylene (iPP); the rubber component added the TPV formulation can be an EPDM rubber, and a PEDM terpolymer can be added to the TPV formulation as a compatibilizer; such TPV formulation can further include one or more diluents. A "diluent" is a non-reactive, non-curing component such as a mineral oil, naphthenic oil, linear or branched olefin oil, or some combination thereof. During mixing of such a TPV formulation, another portion of a diluent may be added (which may be the same or different from one included in the TPV formulation before such addition) and the mixing continued. Then one or more curatives or curative composition can be added, thus beginning the vulcanizing reactions and providing a reacting TPV formulation, and the mixing continued. A further portion of a diluent can be added and the mixing continued until the reacting is completed to a desired degree, providing a TPV composition, and then the TPV composition is recovered, for example by pressing the composition through an extrusion die at an appropriate temperature.

In some implementations of such a method as above, the EPDM rubber can be added in an amount from 35 to 55 wt % of the TPV formulation, isotactic polypropylene (iPP) can added in an amount from 20 to 30 wt % of the TPV formulation; the total amount of diluent added can be from 13 to 21 wt % of the TPV formulation, and a propylene-ethylene-diene terpolymer (PEDM) compatibilizer can be added in an amount from 0.5 to 15 wt % of the TPV formulation.

In some instances of such a method as above, the curative can be added as a resin-in-oil composition, stannous chloride and zinc oxide. In such instances, typically the RIO composition is added to the mixing TPV formulation, and then after some further mixing, the stannous chloride and zinc oxide are added. The RIO composition can be added to a mixer in which the TPV formulation is reacting from a different physical location on the mixer from the position at which the zinc oxide and stannous chloride are added.

In some instances of a method as disclosed above, the mixing (and reacting, after the curative(s) are added) can be performed at a temperature of from 150 to 200° C. in a batch internal mixer, which can for example be a Brabender or Banbury mixer, running at from 80 to 120 rpm, and the mixing can be continued for about 1 minute between the step of mixing the iPP, EPDM, PEDM and first portion of diluent and the step of adding the second portion of diluent, and the mixing can be continued for about 2 minutes between the addition of the second portion of diluent and adding the curative(s), and the mixing can be continued for about 5 minutes between adding the curative(s) and the step of adding the third portion of diluent, and the mixing can then be continued for about 3 minutes before recovering the TPV composition.

Some instances of a method performed as disclosed above are performed at a temperature from 200 to 250° C. in a continuous twin-screw extruder running at from 50 to 200 RPM with 1 to 5 minutes of residence time of the TPV formulation. In some such implementations, the different components of the TPV formulation can be added from two or more different positions about the mixer. For example, the iPP, EPDM and PEDM components, with a first part of diluent might be added at a first position along the flow of a continuous intermeshing twin-screw extruder, and the second portion of diluent and the curative(s) might be added from a second position downstream from the first position.

Figure 2:
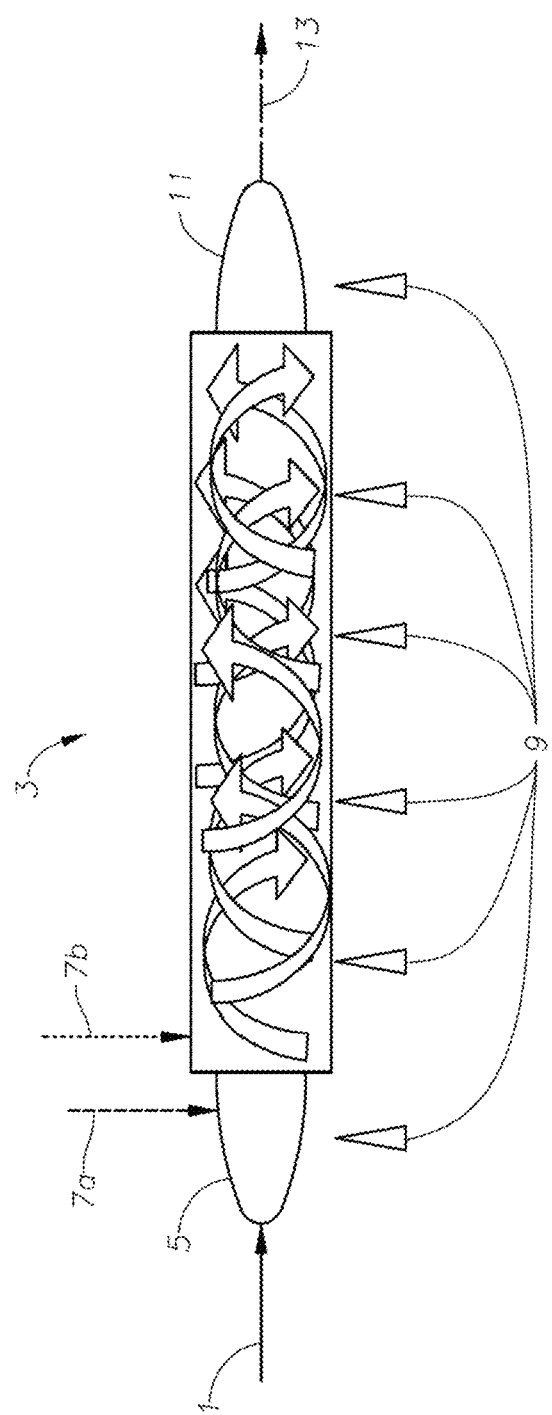
FIG. 2 illustrates schematically one embodiment of a process as disclosed herein and an associated apparatus.

Referring now to FIG. 2, a schematic illustration of one embodiment of a process and associated apparatus according to the present disclosure, a feed 1 comprising one or more of a polypropylene, e.g., iPP, a rubber component, e.g., an EPDM terpolymer, a compatibilizer e.g., a PEDM terpolymer and optional processing oil, is introduced to an internal mixer 3, e.g., an intermeshing twin-screw extruder, via an inlet 5 that is configured to receive the selected ingredients. The mixer is further configured with additional inlets for feeds for additional ingredients 7a, 7b, of the TPV formulation, e.g., one or more of a curative or another additive such as a filler. The mixer is further configured with one or more temperature controllers or heaters 9, configured to raise the temperature of the TPV composition to at least the Tm of the TPV composition and maintain the temperature of the TPV composition within the mixer, including at the inlet, along the length of the mixer and at the outlet 11, at a desired temperature between Tm and the degradation temperature of the TPV composition. The temperature need not be the same from the inlet along the length of the mixer and at the outlet, but can be varied along this path as desired. The melted TPV composition is mixed and reacted to form the thermoplastic vulcanizate and then fed via an outlet 11 to provide a TPV extrudate stream 13 that can be fed, for example, to a pelletizer (not shown) to be cooled and pelleted, or to any other desired downstream process. The outlet 11 can be configured with an extrusion die to shape the extrudate in some fashion if that is desired. The temperature of the outlet 11 is maintained at a desired temperature for extrusion or process for the recovery of the TPV composition by the temperature controller 9 configured to maintain the temperature of the TPV composition at the outlet.

Figure 3:
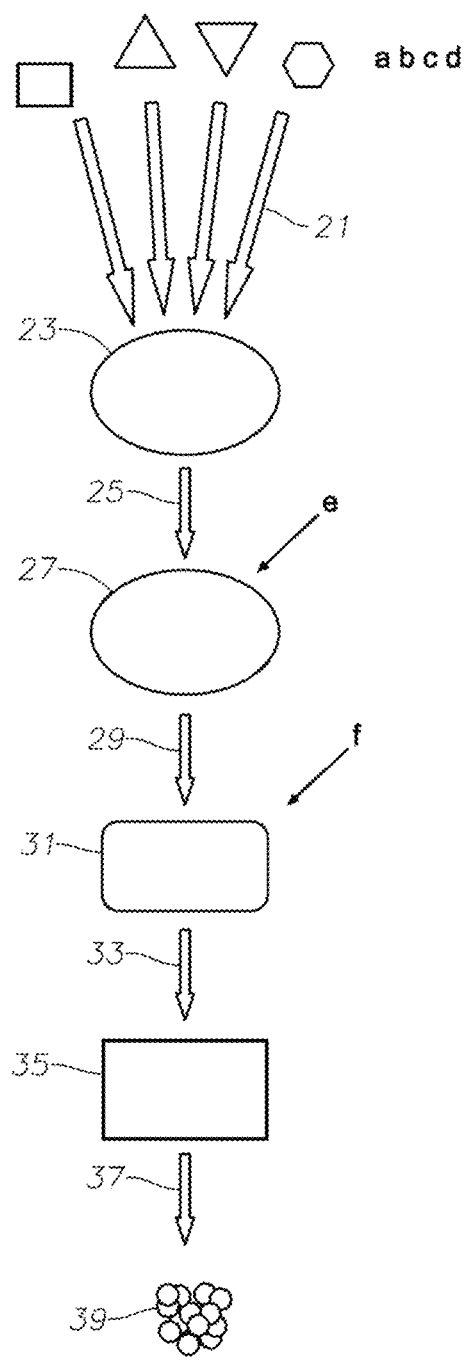
FIG. 3 shows a flow diagram of one embodiment of a process as disclosed herein.
Figure 4A:
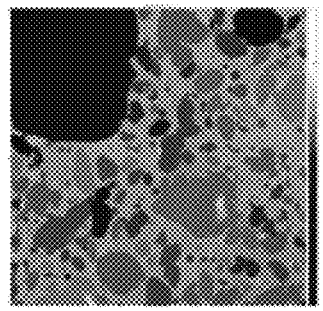
FIG. 4A, FIG. 4B, FIG. 4C, FIG. 4D, FIG. 4E, FIG. 4F, and FIG. 4G show EPDM rubber dispersions in example TPV compositions: 4A—0 wt % of PEDM2, 4B—2 wt % of PEDM2, 4C—5 wt % of PEDM2, 4D—10 wt % of PEDM2, 4E—15% of PEDM2, 4F—20 wt % of PEDM2, and 4G—30 wt % of PEDM2.
Figure 4B:
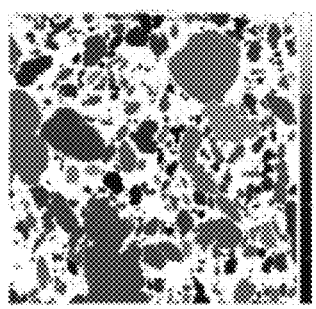
Figure 4C:
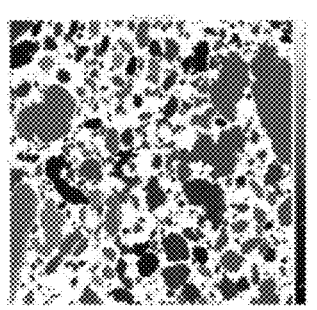
Figure 4D:
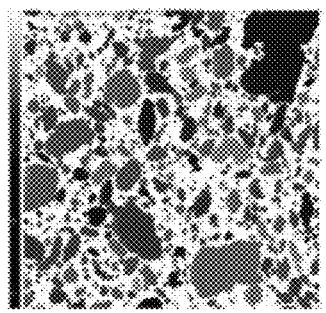
Figure 4E:
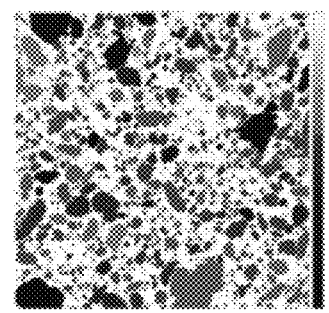
Figure 4F:
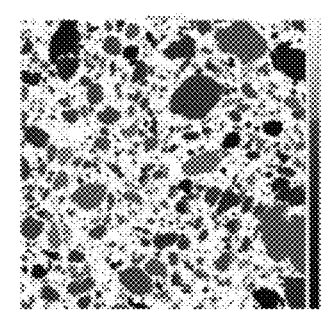
Figure 4G:
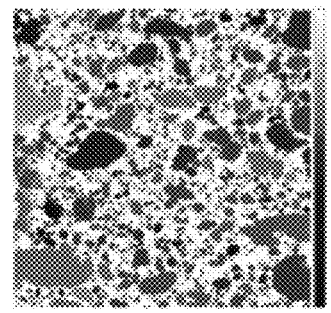

Referring now to FIG. 3, a process flow diagram for one embodiment of a method according to the present disclosure, at arrows 21, the basic ingredients of a TPV formulation (rubber component a, thermoplastic component "b", oil "c", compatibilizer "d" are introduced into a mixer and mixed to form a TPV formulation (i.e., an unvulcanized TPV composition) 23, which is subjected to further mixing at step 25 for a period of time. One or more curatives, or a curative composition comprising a vulcanizing agent and one or more curing accelerators "e" are mixed with the TPV formulation to form a reacting TPV formulation 27, which is subjected to further mixing 29. Further processing oil "f" is added to the partially or completely vulcanized composition 31 and mixing is continued to form a final TPV composition 35, which is then recovered and optionally can be further processed 37, e.g. by cooling and pelleting, or extrusion to form a slab or other shape 39.

EMBODIMENTS

Embodiment 1: A thermoplastic vulcanizate comprising an isotactic polypropylene matrix phase in which a cross-linked ethylene-propylene-diene terpolymer (EPDM) is dispersed, the vulcanizate comprising the reaction product of:
a) 35 to 55 wt % of an ethylene-propylene-diene terpolymer (EPDM);
b) 20 to 30 wt % of isotactic polypropylene (iPP);
c) 10 to 25 wt % of a diluent;
d) 0.5 to 15 wt % of a propylene-ethylene-diene terpolymer (PEDM) compatibilizer; and
e) 1.5 -3.0 wt % of curatives; each component by weight of the TPV formulation (all components combined).

Embodiment 2: The thermoplastic vulcanizate of embodiment 1, in which the EPDM comprises 55 to 75 wt % ethylene, 2 to 10 wt % ethylene norbornene.

Embodiment 3: The thermoplastic vulcanizate of embodiment 1 or 2, in which the amount of PEDM is from 2 to 30 wt % of the amount of EPDM.

Embodiment 4: The thermoplastic vulcanizate of any one of embodiments 1 to 3, in which the $MFR_{2.16}$ at 230° C. of the PEDM is from 0.5 to 20 g/10 min.

Embodiment 5: The thermoplastic vulcanizate of any one of embodiments 1 to 4, in which the PEDM comprises 5 to 20 wt % ethylene (derived monomer units) and 2 to 15 wt % ethylene norbornenes (derived monomer units).

Embodiment 6: The thermoplastic vulcanizate of any one of embodiments 1 to 6 that has a particle size dispersity index (PSDI) of rubber particle size distribution less than 3.

Embodiment 7: A method for preparing a thermoplastic vulcanizate (TPV) comprising:
i) mixing an iPP, EPDM, PEDM, and a diluent to prepare a TPV formulation;
ii) adding a diluent to the TPV formulation and continuing mixing;
iii) adding one or more curatives to the TPV formulation and continuing mixing to perform dynamic vulcanization;
iv) adding a further portion of diluent and continuing mixing and dynamic vulcanization to form a TPV composition; and
v) recovering the TPV composition.

Embodiment 8: The method of embodiment 7, in which the curatives are a resin in oil (RIO) composition, stannous chloride and zinc oxide and the RIO composition is added first, followed by additional mixing, then the stannous chloride and zinc oxide are added.

Embodiment 9: The method of embodiment 7 or 8, in which the ethylene-propylene-diene terpolymer (EPDM) is added in an amount from 35 to 55 wt % of the TPV formulation, the isotactic polypropylene (iPP) is added in an amount from 20 to 30 wt % of the TPV formulation; diluent is added in an amount from 13 to 21 wt % of the TPV formulation, a propylene-ethylene-diene terpolymer (PEDM) compatibilizer is added in an amount from 0.5 to 15 wt % of the TPV formulation.

Embodiment 10: The method of any one of embodiments 7 to 9 that is performed at a temperature of from 150 to 200° C. in a batch internal mixer running at from 80 to 120 rpm and mixing continues for about 1 minute between i) and ii), for about 2 minutes between ii) and iii), for about 5 minutes between iii) and iv) and for about 3 minutes after v).

Embodiment 11. The method of any one of embodiments 7 to 10 that is performed at a temperature from 200 to 250° C. in a continuous twin-screw extruder running at from 50 to 200 RPM with 1 to 5 minutes of residence time wherein the iPP, EPDM, and PEDM, and first portion of a diluent are added to the extruder at a first position of the extruder, and at least one of the second portion of diluent, the curatives and the third portion of diluent are added to the extruder at least a second position downstream from the first position.

Embodiment 13: The method of embodiment 8, that is performed at a temperature of from 150 to 200° C. in an internal mixer running at from 80 to 120 rpm and mixing continues for about 1 minute between i) and ii), for about 2 minutes between ii) and iii), for about 5 minutes between iii) and iv) and for about 3 minutes after v); and the mixing is performed for about 1 minute between addition of the RIO composition and addition of the stannous chloride and the zinc oxide.

Embodiment 14: The method of embodiment 8 that is performed at a temperature from 200 to 250° C. in a continuous twin-screw extruder running at from 50 to 200 RPM with 1 to 5 minutes of residence time; and in which the RIO composition is added to the extruder at a first position, followed by additional mixing, then the stannous chloride and zinc oxide are added to the extruder at a second, downstream position.

Embodiment 15: A TPV composition made by a method comprising:
  i) mixing an iPP, EPDM, and PEDM, and a diluent to prepare a TPV formulation;
  ii) adding a diluent to the TPV formulation and continuing mixing;
  iii) adding one or more curatives to the TPV formulation and continuing mixing to perform dynamic vulcanization;
  iv) adding a further portion of diluent and continuing mixing and dynamic vulcanization to form a TPV composition; and
  v) recovering the TPV composition;
in which the ethylene-propylene-diene terpolymer (EPDM) is added in an amount from 35 to 55 wt % of the TPV formulation, the isotactic polypropylene (iPP) is added in an amount from 20 to 30 wt % of the TPV formulation, diluent is added in an amount from 13 to 21 wt % of the TPV formulation, and a propylene-ethylene-diene terpolymer (PEDM) compatibilizer is added in an amount from 0.5 to 15 wt % of the TPV formulation.

Embodiment 16: The TPV composition of embodiment 15, in which the addition and mixing steps are performed at a temperature of from 150 to 200° C. in an internal mixer running at from 80 to 120 rpm and mixing continues for about 1 minute between i) and ii), for about 2 minutes between ii) and iii), for about 5 minutes between iii) and iv) and for about 3 minutes after v); and the mixing is performed for about 1 minute between addition of the RIO composition and addition of the stannous chloride and the zinc oxide.

EXAMPLES

The following examples are presented for illustrative purposes and not intended to limit the scope of the present disclosure.

PEDM Synthesis

PEDMs were produced using a solution process in a 0.5-liter continuous stirred-tank reactor (autoclave reactor). The autoclave reactor was equipped with a stirrer, a water-cooling/steam-heating element with a temperature controller, and a pressure controller. Solvents and monomers were first purified by passing through a three-column purification system. The purification system consisted of an Oxiclear column (Model # RGP-R1-500 from Labclear) followed by a 5 A and a 3 A molecular sieve column. Purification columns were regenerated periodically whenever there was evidence of low catalyst activity. Isohexane was used as a solvent. Solvent was fed into the reactor using a Pulsa pump and its flow rate was controlled by adjusting the outflow at the pump (using a calibration curve). The compressed, liquefied propylene feed was controlled by a mass flow controller. Ethylene was mixed with propylene before the reactor and fed to a reactant inlet manifold. A mixture of isohexane and tri-n-octylaluminum (TNOAL) and ethylene norbornene (ENB) was also added to the reactant inlet manifold through a separate line and the combined mixture of monomers and solvent was fed into the reactor using a single tube.

The polymerization catalyst used was bis(p-triethylsilylphenyl) carbyl(cyclopentadienyl)(2,7-di-t-butylfluorenyl) hafnium dimethyl activated by N,N-dimethylanilinium tetrakis(pentafluorophenyl) borate. Both the catalyst and activator were first dissolved in toluene and the solutions were kept in an inert atmosphere. The solutions of catalyst and activator were premixed and fed into the reactor using an ISCO syringe pump. The catalyst to activator feed ratio (molar) was set at 0.98. The collected samples were first placed on a boiling-water steam table in a hood to evaporate a large fraction of the solvent and unreacted monomers, and then dried in a vacuum oven at a temperature of ~90° C. for 12-18 hours. The vacuum oven dried samples were weighed to obtain yields. All reactions were carried out at a gauge pressure of about 2.2 MPa and at temperatures from 100 to 120° C. Compositions of these amorphous PEDMs (with zero crystallinity) thus prepared are shown in Table 1, where the "wt %" ethylene is the weight percent of ethylene-derived units by weight of the PEDM, and the wt % ENB is the weight percent of the ethylene-norbornene-derived units by weight of the PEDM. MFR was measured at 230° C. at 2.16 kg loading.

TABLE 1

| PEDM compatibilizers synthesized. | | | |
| --- | --- | --- | --- |
| | Ethylene (wt %) | ENB (wt %) | MFR, g/10 min |
| PEDM1 | 15 | 2.9 | 16 |
| PEDM2 | 11.4 | 2.8 | 1.0 |
| PEDM3 | 16.5 | 11.3 | 3.3 |
| PEDM4 | 12 | 3.6 | 1.1 |

TPV Preparation

The main ingredients used in the exemplary TPVs are isotactic polypropylene (iPP) (PP5341, 0.8 MFR, ExxonMobil Chemical), EPDM (oil extended with 75 phr oil, 64% ethylene, 4.5% ENB, 52 Mooney, ExxonMobil Chemical), and oil (Sunpar 150, Sunoco). Curatives employed for vulcanization included phenolic resin in oil (RIO) stannous chloride, $SnCl_2$, and zinc oxide, ZnO. The RIO composition is 30/70 resin/oil composition (here a paraffinic oil, Sunpar 150) the resin used is SP1045 phenolic (octylphenol-formaldehyde resin with methylol active group). Detailed TPV formulations for Examples 1 to 25 are found in Tables 2 to 5 below. Amounts are in grams. It should be noted that oil amount is adjusted in each formulation according to the EPDM amount used since the EPDM used contains oil by itself. The adjustment ensures that the final and total oil amount in each formulation is the same. The amounts of PEDM used are from 0.4, 0.9, 1.9, 2.8, 3.8, to 5.6 gm, corresponding to 2 wt %, 5 wt %, 10 wt %, 15 wt %, 20 wt %, and 30 wt % of PEDM to EPDM. All TPVs were prepared in a Brabender internal mixer running at 180° C. (356° F.) and 100 RPM. EPDM, PEDM, and PP were added at the beginning, after 1 minute, ½ of the oil was added, then after 2 min, the RIO was introduced, mixed for 1 min and $SnCl_2$/ZnO was added, mixed for another 5 min, finally the other ½ of oil was added and mixed for 3 minutes. The total mix time was 12 minutes.

TABLE 2

TPV Compound Formulations without PEDM and with PEDM1.

|  | Example 1 | Example 2 | Example 3 | Example 4 | Example 5 | Example 6 | Example 7 |
|---|---|---|---|---|---|---|---|
| EPDM | 32.8 | 32.2 | 31.2 | 29.5 | 27.9 | 26.3 | 23.0 |
| PP | 18.8 | 18.8 | 18.8 | 18.8 | 18.8 | 18.8 | 18.8 |
| Oil | 8.44 | 8.72 | 9.14 | 9.84 | 10.55 | 11.25 | 12.66 |
| PEDM1 | 0.0 | 0.4 | 0.9 | 1.9 | 2.8 | 3.8 | 5.6 |
| Curatives: |  |  |  |  |  |  |  |
| RIO | 0.9 | 0.9 | 0.9 | 0.9 | 0.9 | 0.9 | 0.9 |
| $SnCl_2$ | 0.1 | 0.1 | 0.1 | 0.1 | 0.1 | 0.1 | 0.1 |
| ZnO | 0.4 | 0.4 | 0.4 | 0.4 | 0.4 | 0.4 | 0.4 |

TABLE 3

TPV Compound Formulations Containing PEDM2.

|  | Example 8 | Example 9 | Example 10 | Example 11 | Example 12 | Example 13 |
|---|---|---|---|---|---|---|
| EPDM | 32.2 | 31.2 | 29.5 | 27.9 | 26.3 | 23.0 |
| PP | 18.8 | 18.8 | 18.8 | 18.8 | 18.8 | 18.8 |
| Oil | 8.72 | 9.14 | 9.84 | 10.55 | 11.25 | 12.66 |
| PEDM2 | 0.4 | 0.9 | 1.9 | 2.8 | 3.8 | 5.6 |
| Curatives: |  |  |  |  |  |  |
| RIO | 0.9 | 0.9 | 0.9 | 0.9 | 0.9 | 0.9 |
| $SnCl_2$ | 0.1 | 0.1 | 0.1 | 0.1 | 0.1 | 0.1 |
| ZnO | 0.4 | 0.4 | 0.4 | 0.4 | 0.4 | 0.4 |

TABLE 4

TPV Compound Formulations Containing PEDM3.

|  | Example 14 | Example 15 | Example 16 | Example 17 | Example 18 | Example 19 |
|---|---|---|---|---|---|---|
| EPDM | 32.2 | 31.2 | 29.5 | 27.9 | 26.3 | 23.0 |
| PP | 18.8 | 18.8 | 18.8 | 18.8 | 18.8 | 18.8 |
| Oil | 8.72 | 9.14 | 9.84 | 10.55 | 11.25 | 12.66 |
| PEDM3 | 0.4 | 0.9 | 1.9 | 2.8 | 3.8 | 5.6 |
| Curatives: |  |  |  |  |  |  |
| RIO | 0.9 | 0.9 | 0.9 | 0.9 | 0.9 | 0.9 |
| $SnCl_2$ | 0.1 | 0.1 | 0.1 | 0.1 | 0.1 | 0.1 |
| ZnO | 0.4 | 0.4 | 0.4 | 0.4 | 0.4 | 0.4 |

TABLE 5

TPV Compound Formulations Containing PEDM4.

|  | Example 20 | Example 21 | Example 22 | Example 23 | Example 24 | Example 25 |
|---|---|---|---|---|---|---|
| EPDM | 32.2 | 31.2 | 29.5 | 27.9 | 26.3 | 23.0 |
| PP | 18.8 | 18.8 | 18.8 | 18.8 | 18.8 | 18.8 |
| Oil | 8.72 | 9.14 | 9.84 | 10.55 | 11.25 | 12.66 |
| PEDM3 | 0.4 | 0.9 | 1.9 | 2.8 | 3.8 | 5.6 |
| Curatives: |  |  |  |  |  |  |
| RIO | 0.9 | 0.9 | 0.9 | 0.9 | 0.9 | 0.9 |
| $SnCl_2$ | 0.1 | 0.1 | 0.1 | 0.1 | 0.1 | 0.1 |
| ZnO | 0.4 | 0.4 | 0.4 | 0.4 | 0.4 | 0.4 |

TPV Dispersion and Properties

All TPV samples, including control (example 1), were cryo-faced using a cryo-microtom (Leica) and examined afterward by a tapping phase AFM (atomic force microscopy, Icon, Bruker). For each sample, three 60 by 60 micron$^2$ phase images were collected and then processed by SPIP software (scanning probe image processing, Image Metrology). Image processing results of all examples are tabulated in Tables 6-9 along with their mechanical properties. Particle count is the number of dispersion particles measured in images and Dn, Dw, and Dv are equivalent dispersion diameters of number average, weight average, and volume average respectively. Dw/Dn is the "particle size dispersity index", or PSDI, and is a measure of the size dispersity. The area percent is the percentage of area occupied by these vulcanized rubber particles. All TPV samples were compression molded into test specimens for mechanical measurements. ISO 37 was the method used for tensile, 20 inch/min using 30 mm grip, measurements to obtain elongation to break in percent and break stress in MPa. D-790 ProA was the method used to determine the flex modulus, at 0.05 in/min deformation rate, in MPa. Hysteresis values were determined by the energy loss, in J, during tensile extensions to 200% in 2 cycles at 200 mm/min. The 1$^{st}$ hysteresis is for the 1$^{st}$ cycle of loading and unloading and 2$^{nd}$ hysteresis is for the 2$^{nd}$ cycle of loading and unloading.

TABLE 6

TPV Compound Properties and Dispersion Sizes (containing PEDM1).

|  | Example 1 | Example 2 | Example 3 | Example 4 | Example 5 | Example 6 | Example 7 |
|---|---|---|---|---|---|---|---|
| Break stress (MPa) | 4.16 | 4.46 | 4.01 | 4.25 | 3.75 | 3.88 | 3.96 |
| Break strain (%) | 134.5 | 188.08 | 131.21 | 163.83 | 76.84 | 153.56 | 169.73 |
| Flex modulus (MPa) | 72.73 | 73.21 | 71.16 | 66.58 | 63.54 | 62.63 | 57.94 |

TABLE 6-continued

TPV Compound Properties and Dispersion Sizes (containing PEDM1).

|  | Example 1 | Example 2 | Example 3 | Example 4 | Example 5 | Example 6 | Example 7 |
|---|---|---|---|---|---|---|---|
| $1^{st}$ hysteresis (Joules) | 0.707 | 0.979 | 0.501 | 0.773 | 0.337 | 0.627 | 0.678 |
| $2^{nd}$ Hysteresis (Joules) | 0.021 | 0.2 | 0.019 | 0.023 | 0.021 | 0 | 0 |
| Dispersion: | | | | | | | |
| Dn (nm) | 464.7 | 1128.0 | 535.9 | 678.1 | 422.1 | 534.0 | 554.3 |
| Dw (nm) | 3614.1 | 3143.5 | 2578.8 | 2119.5 | 2435.4 | 1935.9 | 1890.4 |
| Dv (nm) | 10805.3 | 6052.6 | 6879.8 | 4299.1 | 8667.3 | 4181.4 | 3877.5 |
| Dw/Dn | 7.8 | 2.8 | 4.8 | 3.1 | 5.8 | 3.6 | 3.4 |
| Area % | 61.2 | 56.8 | 55.2 | 54.7 | 52.7 | 59.3 | 58.7 |
| Count | 5019 | 2206 | 5508 | 5249 | 7074 | 7910 | 7734 |

TABLE 7

TPV Compound Properties and Dispersion Sizes (containing PEDM2).

|  | Example 8 | Example 9 | Example 10 | Example 11 | Example 12 | Example 13 |
|---|---|---|---|---|---|---|
| Break stress (MPa) | 4.12 | 4.38 | 4.22 | 4.2 | 3.72 | 4.26 |
| Break strain (%) | 171.67 | 230.02 | 205.84 | 204.06 | 151.93 | 225.03 |
| Flex modulus (MPa) | 107.25 | 115.83 | 99.43 | 103.1 | 85.56 | 87.49 |
| $1^{st}$ hysteresis (Joules) | 0.981 | 1.070 | 1.027 | 1.138 | 0.631 | 1.074 |
| $2^{nd}$ Hysteresis (Joules) | 0.126 | 0.340 | 0.264 | 0.471 | 0.004 | 0.444 |
| Dispersion: | | | | | | |
| Dn (nm) | 1297.2 | 1037.0 | 841.7 | 570.2 | 549.2 | 630.6 |
| Dw (nm) | 3353.0 | 2671.0 | 3137.0 | 2238.7 | 2157.5 | 2134.1 |
| Dv (nm) | 6426.3 | 5113.1 | 10176.8 | 5254.7 | 6137.8 | 5238.0 |
| Dw/Dn | 2.6 | 2.6 | 3.7 | 3.9 | 3.9 | 3.4 |
| Area % | 52.45 | 48.55 | 58.51 | 53.87 | 51.1 | 52.91 |
| Count | 1662 | 2419 | 3054 | 5818 | 5947 | 5421 |

TABLE 8

TPV Compound Properties and Dispersion Sizes (containing PEDM3).

|  | Example 14 | Example 15 | Example 16 | Example 17 | Example 18 | Example 19 |
|---|---|---|---|---|---|---|
| Break stress (MPa) | 4.71 | 4.69 | 3.86 | 5.07 | 5.87 | 5.65 |
| Break strain (%) | 240.29 | 250.56 | 129.34 | 294.31 | 351.29 | 379.67 |
| Flex modulus (MPa) | 102.43 | 89.67 | 80.47 | 93.89 | 80.14 | 84.52 |
| $1^{st}$ hysteresis (Joules) | 1.057 | 1.124 | 0.618 | 1.058 | 1.168 | 1.121 |
| $2^{nd}$ Hysteresis (Joules) | 0.382 | 0.472 | 0.006 | 0.391 | 0.520 | 0.401 |
| Dispersion: | | | | | | |
| Dn (nm) | 538.3 | 948.6 | 467.8 | 757.7 | 1057.1 | 998.9 |
| Dw (nm) | 3248.8 | 3600.3 | 3140.6 | 2672.5 | 2140.3 | 1892.6 |
| Dv (nm) | 11131.6 | 10929.3 | 10874.8 | 8940.7 | 2846.0 | 2484.7 |
| Dw/Dn | 6.0 | 3.8 | 6.7 | 3.5 | 2.0 | 1.9 |
| Area % | 58.41 | 58.48 | 59.13 | 58.22 | 58.99 | 53.88 |
| Count | 4604 | 2360 | 5548 | 3964 | 3601 | 3939 |

TABLE 9

TPV Compound Properties and Dispersion Sizes (containing PEDM4).

|  | Example 20 | Example 21 | Example 22 | Example 23 | Example 24 | Example 25 |
|---|---|---|---|---|---|---|
| Break stress (MPa) | 6.51 | 6.29 | 5.45 | 5.48 | 5.47 | 4.96 |
| Break strain (%) | 417.64 | 384.23 | 375.26 | 363.4 | 299.53 | 283.8 |
| Flex modulus (MPa) | 80.96 | 90.55 | 90.36 | 103.84 | 97.68 | 100.25 |
| $1^{st}$ hysteresis (Joules) | 1.133 | 1.156 | 1.132 | 1.181 | 1.205 | 0.876 |
| $2^{nd}$ Hysteresis (Joules) | 0.503 | 0.514 | 0.470 | 0.495 | 0.525 | 0.287 |
| Dispersion: | | | | | | |
| Dn (nm) | 1185.5 | 1002.9 | 1089.7 | 886.4 | 848.7 | 777.9 |
| Dw (nm) | 2525.2 | 1981.5 | 1936.0 | 1818.5 | 1689.5 | 1721.1 |
| Dv (nm) | 4005.3 | 2991.5 | 2500.4 | 2689.2 | 2524.5 | 2823.2 |
| Dw/Dn | 2.1 | 2.0 | 1.8 | 2.1 | 2.0 | 2.2 |
| Area % | 56.43 | 57.87 | 57.6 | 53 | 51.5 | 54.63 |
| Count | 2604 | 4021 | 3766 | 4547 | 4959 | 5637 |

PEDM Compatibilizer Effects

Figure 5:
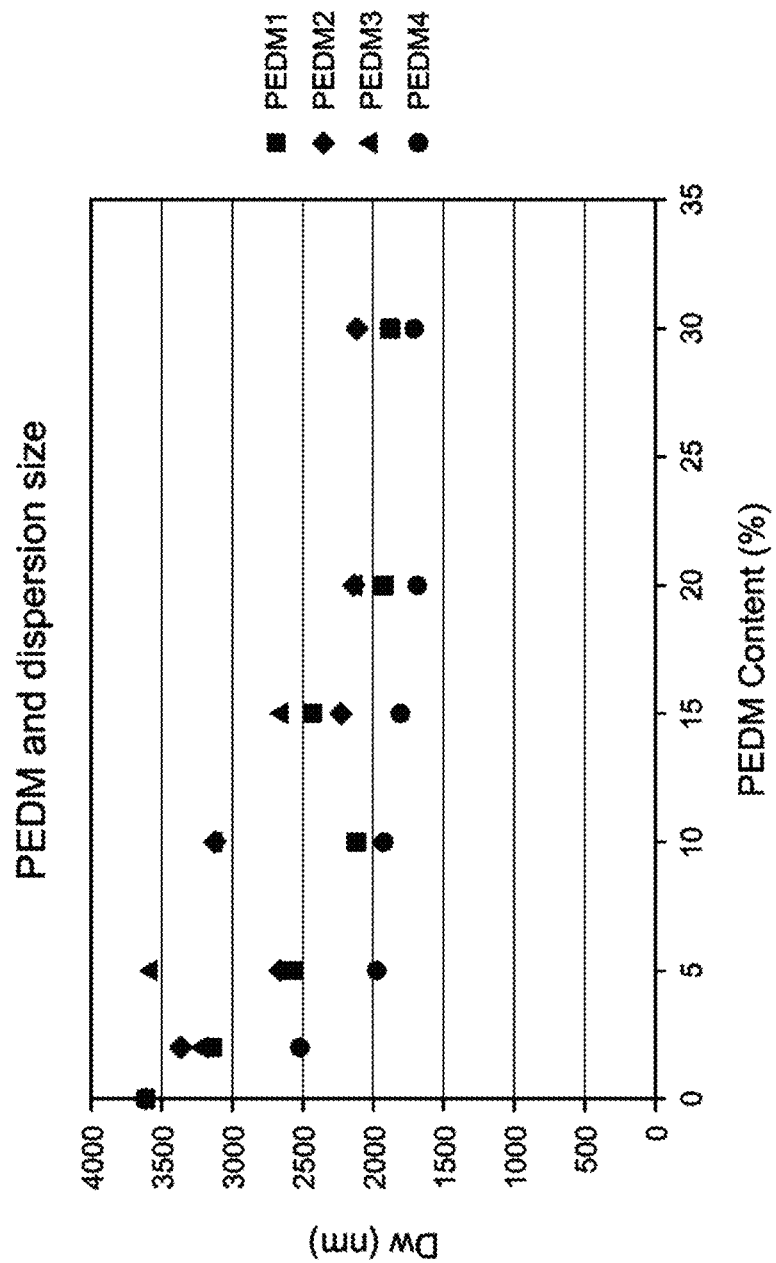
FIG. 5 is a graph of weight average dispersion size dependence on PEDM amount.
Figure 6:
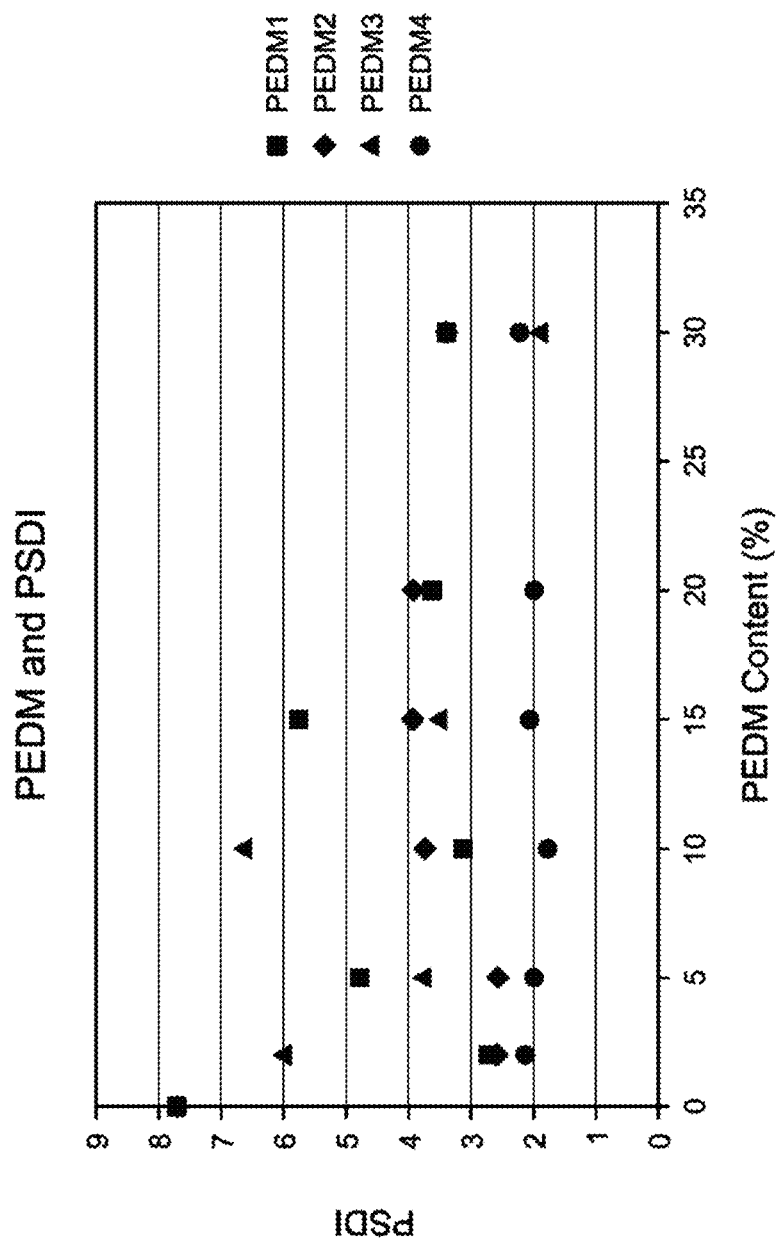
FIG. 6 is a graph of dispersity dependence on PEDM amount.
Figure 7:
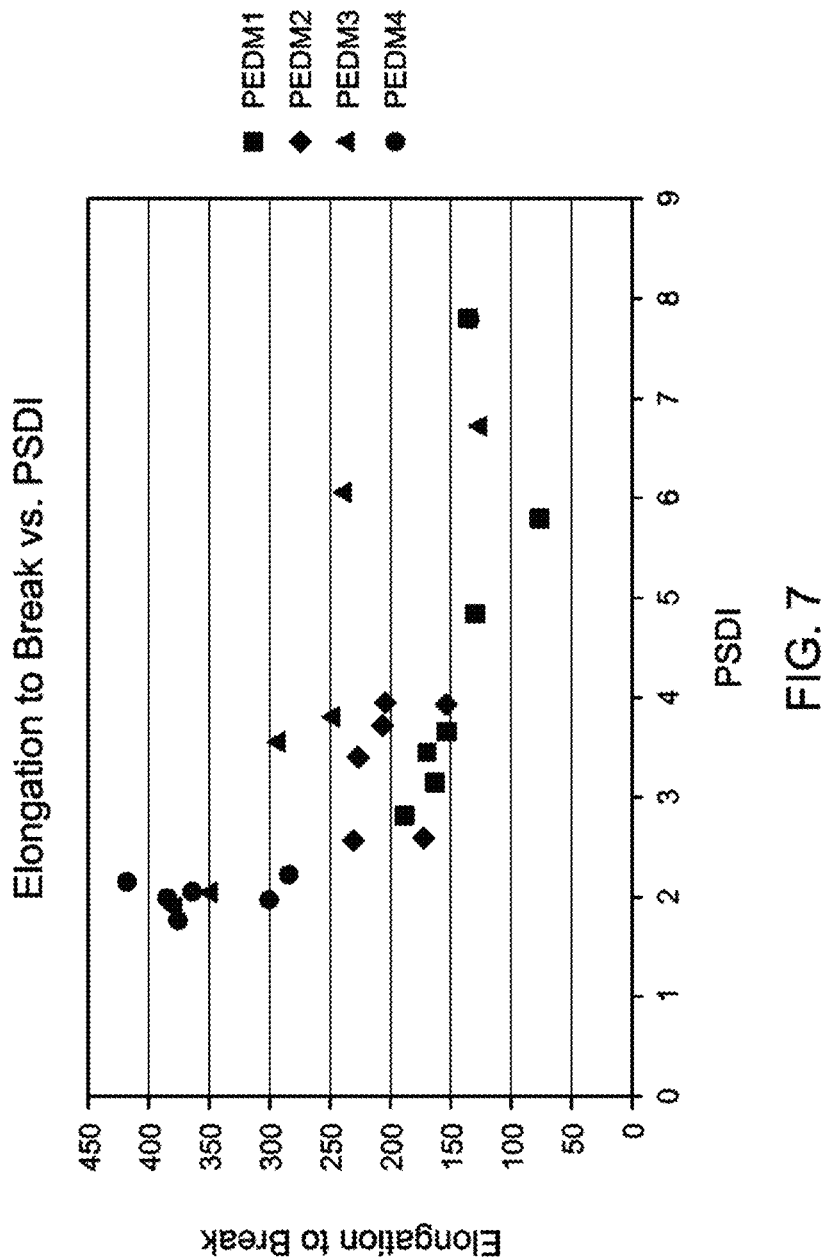
FIG. 7 is a graph of elongation to break dependence on dispersion PSDI.

As shown in FIG. 4A, FIG. 4B, FIG. 4C, FIG. 4D, FIG. 4E, FIG. 4F, and FIG. 4G, addition of PEDM, in this case PEDM2, into a PE/EPDM TPV can lower the dispersion size and improve the dispersion uniformity. The reductions in weight average dispersion size and particle size dispersity index (PSDI=Dw/Dn), in these TPVs with the addition of PEDM, from PEDM1 to PEDM4, can be found in FIG. 5 and FIG. 6. Importantly, as indicated in FIG. 7 and FIG. 8, reducing PSDI contributes the most to enhancements in toughness by raising the elongation to break and break stress. Hence, the addition of PEDM compatibilizer in a PP/EPDM TPV lowers the EPDM dispersion size, improves EPDM dispersion uniformity, and raises the TPV toughness.

While the present disclosure has been described and illustrated by reference to particular embodiments, those of ordinary skill in the art will appreciate that the disclosure lends itself to variations not necessarily illustrated herein. For this reason, then, reference should be made solely to the appended claims for purposes of determining the scope of the present disclosure. Further, the term "comprising" is considered synonymous with the term "including". Likewise, whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

The invention claimed is:

1. A thermoplastic vulcanizate comprising an isotactic polypropylene matrix phase in which a cross-linked ethylene-propylene-diene terpolymer (EPDM) is dispersed, the vulcanizate comprising the reaction product of:
    a) 35 to 55 wt % of an ethylene-propylene-diene terpolymer (EPDM), wherein the EPDM comprises 50 to 80 wt% ethylene;
    b) 20 to 30 wt % of isotactic polypropylene (iPP);
    c) 10 to 25 wt % of a diluent;
    d) 0.5 to 15 wt % of a propylene-ethylene-diene terpolymer (PEDM) compatibilizer, wherein the PEDM comprises 2 to 25 wt% ethylene and a diene content of 1 to 21 wt%; and
    e) 1.5 to 3.0 wt % of curatives;
    each weight percent is by weight of the combined components.

2. The thermoplastic vulcanizate of claim 1, in which the EPDM comprises 55 to 75 wt % ethylene and 2 to 10 wt % ethylene norbornene.

3. The thermoplastic vulcanizate of claim 1, in which the amount of PEDM is from 3 to 25 wt % of the amount of EPDM.

4. The thermoplastic vulcanizate of claim 1, in which the $MFR_{2.16}$ at 230° C. of the PEDM is from 0.5 to 20 g/10 min.

5. The thermoplastic vulcanizate of claim 1, in which the PEDM comprises 5 to 20 wt % ethylene and 2 to 15 wt % ethylene norbornene.

6. The thermoplastic vulcanizate of claim 1, wherein the particle size dispersity index (PSDI) is less than 3.

* * * * *